(12) United States Patent
Lam

(10) Patent No.: US 12,098,849 B2
(45) Date of Patent: Sep. 24, 2024

(54) SMOKELESS GRILL

(71) Applicant: Lam & Sons, LLC, Cheyenne, WY (US)

(72) Inventor: Paul Wood Yik Lam, Sha Tin (HK)

( * ) Notice: Subject to any disclaimer, the term of this patent is extended or adjusted under 35 U.S.C. 154(b) by 622 days.

(21) Appl. No.: 16/628,775

(22) PCT Filed: Dec. 23, 2019

(86) PCT No.: PCT/US2019/068401
§ 371 (c)(1),
(2) Date: Jan. 6, 2020

(87) PCT Pub. No.: WO2020/139853
PCT Pub. Date: Jul. 2, 2020

(65) Prior Publication Data
US 2021/0310665 A1    Oct. 7, 2021

(51) Int. Cl.
| F24C 15/14 | (2006.01) |
| A47J 37/07 | (2006.01) |
| F24C 15/10 | (2006.01) |
| F24C 15/20 | (2006.01) |

(52) U.S. Cl.
CPC .......... *F24C 15/14* (2013.01); *A47J 37/0709* (2013.01); *A47J 37/0786* (2013.01); *F24C 15/107* (2013.01); *F24C 15/2035* (2013.01); *F24C 15/2042* (2013.01)

(58) Field of Classification Search
CPC .... F24C 15/107; F24C 15/2035; F24C 15/14; F24C 15/20422; A47J 37/0786; A47J 37/0754; A47J 37/0709
See application file for complete search history.

(56) References Cited

U.S. PATENT DOCUMENTS

| 3,596,650 | A | * | 8/1971 | Cerola | F24C 15/2042 |
| | | | | | 126/39 J |
| 4,648,378 | A | * | 3/1987 | Nishikawa | F24C 15/2035 |
| | | | | | 126/299 F |
| 4,705,021 | A | * | 11/1987 | Beach | F24C 15/2042 |
| | | | | | 126/41 R |
| 5,001,970 | A | * | 3/1991 | Graver | F24C 15/2042 |
| | | | | | 126/300 |
| 5,287,799 | A | * | 2/1994 | Pickering | F24C 15/2042 |
| | | | | | 126/211 |
| 10,912,412 | B2 | * | 2/2021 | Thunga | A47J 37/0713 |
| 2007/0062514 | A1 | * | 3/2007 | Ota | A47J 37/0781 |
| | | | | | 126/299 R |

FOREIGN PATENT DOCUMENTS

JP        2000039154 A  *  2/2000

* cited by examiner

*Primary Examiner* — Alfred Basichas
(74) *Attorney, Agent, or Firm* — Donn K. Harms

(57) ABSTRACT

An electric cooking grill has a grate supported on a top side of a grill body having a sidewall. The grate is formed with a plurality of diagonally running grate members on opposing sides of gaps therebetween. A centrally located exhaust housing has curved sidewalls forming an elliptical shape of the exhaust housing. Exhaust openings running along the elliptically curved sidewalls communicate negative pressure to recessed air flowpaths in the gaps to remove smoke with an air filter.

18 Claims, 3 Drawing Sheets

SMOKELESS GRILL

FIELD OF THE INVENTION

This application is a U.S. National Phase application based on International application number PCT/US2019/68401 filed on Dec. 23, 2019 which claims priority to Chinese Provisional Patent application serial number: 201822247671.4, filed on Dec. 28, 2018, which is incorporated herein in its entirety by this reference thereto.

The present device relates to grilling devices. More particularly, the device herein disclosed and described relates to a smokeless grill for cooking food which is employable both indoors and outdoors.

BACKGROUND OF THE INVENTION

Traditional and existing grills, which employ an electric or gas heat source, produce smoke when grilling food. This is especially true when grilling fatty foods. This is because once oil or fat is heated up to 170-200 C, it changes from a liquid to smoke.

Such smoke emitted by such grill cooking is unpleasant, especially in an indoor environment. Consequently, users of such cooking grills are conventionally precluded from cooking indoors thereby making grilling meats and other fatty foods more of an outdoor cooking endeavor.

In the case of electric grills, such are much more ecologically friendly, since they employ electricity as the heat source instead of charcoal and wood fuel which both emit carbon into the atmosphere. Further, electric powered cooking grills can be used indoors since there is no smoke from wood or charcoal nor the emission of carbon monoxide which is a serious health hazard when emitted indoors where it is not disbursed. However, because electric grills will emit smoke and particulate during cooking of meats and other foods thereon during use, they are rarely used indoors.

The forgoing examples of conventional electric cooking grills and their use, are intended to be illustrative and not exclusive, and they do not imply any limitations on the invention described and claimed herein. Various other limitations of the related art are known or will become apparent to those skilled in the art upon a reading and understanding of the specification below and the accompanying drawings.

SUMMARY OF THE INVENTION

The device herein provides a grilling appliance which is structurally configured to eliminate unpleasant smoke during outdoor or indoor grilling of foods. The device thereby provides users a "smokeless grill" which substantially eliminates exhausting smoke and greasy particulate emissions from the grill during cooking.

The smokeless grill device, herein, is configured with a grill plate which includes gutters or openings as well as an elevated air intake housing which work in a symbiotic relationship. This significantly improves smoke and grease emissions, when so paired, above what occurs when such are employed individually.

The grill has an upper surface for cooking opposite a lower surface which faces an electric heat source. A plurality of spaced grill members form openings therebetween. These openings are recessed below the upper surface of the grill contacting food and are positioned to direct oil formed during cooking of fatty foods therethrough. Once communicated through the openings, the formed oil is directed to drip down onto an underlying cooling tray which has enhanced cooling due to a powered exhausting airflow.

Once the dripped oil and fat contacts this cooling tray, the oil is thereon cooled or maintained at a smokeless temperature thereby providing a first means for preventing smoke emission. Thus, a portion of the oil formed during cooking of meats and fatty foods is captured to a cooling container before being heated further by the heat source to a temperature where it would become smoke.

Unfortunately such cooking of foods is not entirely "smokeless", especially when cooking foods of fatty content or foods which have been coated with oil. This is because a portion of the oil from the meat or fatty food being cooked is still heated on the top surface of the grill plate supporting it, and also on top and side surfaces of the meat itself to the temperature noted above where fat will change to smoke. The device herein is configured with secondary smoke prevention systems to prevent this smoke produced on the food and grill plate from communicating to the surrounding room or area.

The device herein disclosed and described employs a grill grate having a first or top surface opposite a second or lower surface. The grate is formed by engaged members on which food is supported on the top surface during cooking. These members are configured in the grate to run in diagonal lines from the perimeter edge of the grate and toward a central area of the grate. These diagonal running members have diagonally running gaps formed therebetween.

An intake opening is positioned in the central area of the grate and is connected to an exhaust housing having a sidewall which extends from, and is elevated above, the top or first surface of the grate. This exhaust housing is in communication with the intake opening and with the intake conduit underneath the grate, which has an intake fan operatively positioned therein.

The intake fan is powered by an electric motor which spins fan blades to create negative air pressure which is communicated through the intake conduit to the intake opening. The negative pressure is then communicated from the intake opening and into the elevated exhaust housing and to a plurality of exhaust openings formed in the sidewall of the exhaust housing. During use, this negative air pressure forms an exhausting flow path for smoke from cooking on the top surface of the grate surrounding the exhaust housing and extracts substantially all the smoke emanating from the food and the grate through the exhaust openings in the elevated sidewall of the exhaust housing.

The extracted smoke, pulled by negative pressure into the exhaust housing through the sidewall-positioned exhaust openings, is then drawn through the intake opening and intake conduit through a filter. This filter is formed of activated charcoal and/or other ceramic or filtering material which is adapted to trap and extract smoke particles from the exhausting airstream and to concurrently cool the air and smoke.

With the smoke and particulate of the exhausting air stream being captured by the filter, the exhaust stream is drawn through the fan and positive pressure of the fan forces clean air exiting the filter through internal conduits, to exit the device through one or preferably a plurality of ducts located on opposing sides of the body of the smokeless grill supporting the grate.

The intake opening is preferably positioned in a central portion of the cooking grate and is in operative communication with the exhaust housing which has a sidewall extending above and away from the top or first surface of the grate, to a top wall of the exhaust housing. In the preferred mode of all modes of the device herein, this exhaust housing sidewall is shaped in an elliptical shape which can be seen when viewed from above. The ellipse-shaped sidewall has a plurality of exhaust openings which extend from first ends positioned adjacent to the top surface of the surrounding grate to second ends of the exhaust openings at the top surface of the exhaust housing.

This elevated positioning of the plurality of exhaust openings communicating through the sidewall of the exhaust housing, communicates the negative air pressure generated by the fan to the intake opening and then to the exhaust openings in the sidewall of the exhaust housing. This positions negative air pressure from each of the sidewall exhaust openings in the elliptically curved sidewall, in a central area of the cooking grate and immediately proximate to all the cooking food surrounding it on the grate thereby enhancing the efficiency to extract the smoke.

Particularly preferred, in all modes of the device herein, is the formation of the cooking grate from a plurality of members running in a diagonal direction from the perimeter edge of the grate toward the centrally located exhaust housing and the individual exhaust openings formed into the elliptical shaped sidewall of the exhaust housing. The plurality of members, running diagonally in this fashion, form a plurality of openings therebetween which also run below the top surface of the grate and diagonally from the perimeter edge of the grate toward the central area and the exhaust openings in the sidewall which is elevated above the top surface of the grate. While originally the exhaust housing was formed in a circular shape when viewed from above the grate, and such worked well, it was found during experimentation that forming the sidewall of the exhaust housing as an ellipse provides a substantial increase in capturing smoke from cooking food on the grate.

It was found, unexpectedly, that by forming the grate with diagonally running members having diagonally running openings or gaps therebetween, toward the sidewall of the exhaust housing and below the top surface of the grate, that a substantial increase in capturing of smoke occurred. The symbiotic combination of the ellipse shape of the sidewall of the exhaust housing positions the exhaust openings aligned with or in a better alignment with the elongated openings or gaps and was found to increase smoke capture through the exhaust openings than was achieved by a round exhaust housing or by an exhaust housing which did not have a sidewall extending from and above the top surface of the cooking grate.

As such, forming the sidewall of the exhaust housing in a substantially round or circular shape projecting above the top surface of the grate to the top wall of the exhaust housing worked better than having the intake opening level or below the top surface of the grate. However, forming the exhaust housing in an ellipse shape when viewed from overhead is especially preferred due to the enhanced removal of smoke provided by the combined symbiotic action of both the diagonal members and diagonal gaps, and the enhanced communication with exhaust openings with the diagonal gaps using the ellipse shape.

With respect to the above description, before explaining at least one preferred embodiment of the herein disclosed smokeless grill invention in detail, it is to be understood that the invention is not limited in its application to the details of construction and to the arrangement of the components in the following description or illustrated in the drawings. The smokeless grill invention herein described and shown is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other smokeless grilling devices and for carrying out the several purposes of the present disclosed device. It is important, therefore, that the claims be regarded as including such equivalent construction and methodology insofar as they do not depart from the spirit and scope of the present invention.

As used in the claims to describe the various inventive aspects and embodiments, "comprising" means including, but not limited to, whatever follows the word "comprising". Thus, use of the term "comprising" indicates that the listed elements are required or mandatory, but that other elements are optional and may or may not be present. By "consisting of" is meant including, and limited to, whatever follows the phrase "consisting of". Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they affect the activity or action of the listed elements. The term "substantially" when employed herein, means plus or minus twenty percent, unless otherwise designated in range.

It is an object of the present invention to provide a cooking grill which substantially eliminates the communication of smoke during cooking to surrounding areas.

It is an additional object of this invention to provide such a smokeless grill which is employable indoors as well as outdoors.

A further object of this invention is to enhance the removal of smoke and particulate from a cooking grill by employing a combination of diagonally oriented members and gaps on the cooking grill with exhaust openings in an ellipse-shaped sidewall of an elevated exhaust housing.

These and other objects, features, and advantages of the present smokeless grill, as well as the advantages thereof over existing prior art, which will become apparent from the description to follow, are accomplished by the improvements described in this specification and hereinafter described in the following detailed description which fully discloses the invention, but should not be considered as placing limitations thereon.

BRIEF DESCRIPTION OF DRAWING FIGURES

The accompanying drawings, which are incorporated herein and form a part of the specification, illustrate some, but not the only or exclusive examples of embodiments and/or features of the disclosed hair trimmer. It is intended that the embodiments and figures disclosed herein are to be considered illustrative of the invention herein, rather than limiting in any fashion. In the drawings.

DETAILED DESCRIPTION OF THE INVENTION

Figure 1:
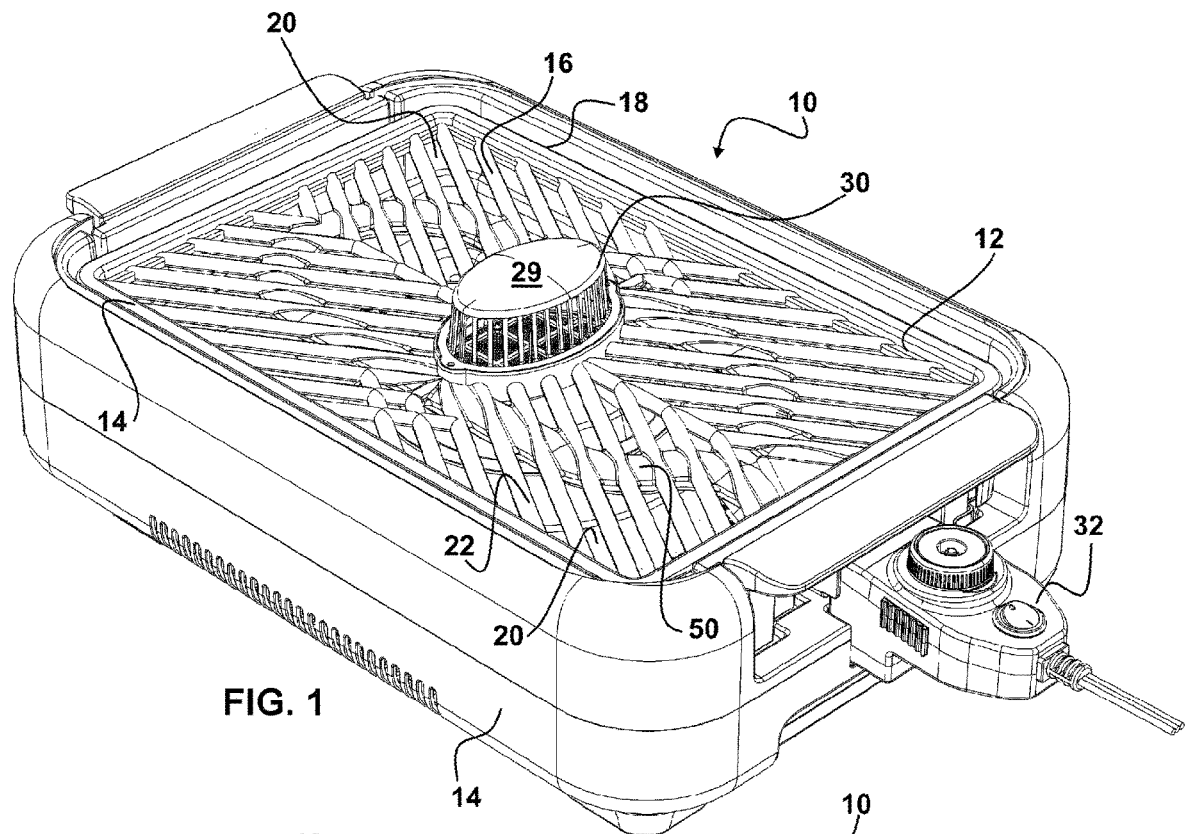
FIG. 1 depicts a top perspective view of the smokeless grill herein disclosed showing the cooking grate having diagonal members with diagonal gaps therebetween which intersect with exhaust openings in a projecting elliptical sidewall of a centrally located exhaust housing.

In this description, the directional prepositions of up, upwardly, down, downwardly, front, back, top, upper, bottom, lower, left, right and other such terms refer to the device as it is oriented and appears in the drawings and are used for convenience only and such are not intended to be limiting or to imply that the device has to be used or positioned in any particular orientation.

Now referring to drawings in FIGS. 1-6, wherein similar components are identified by like reference numerals, there is seen in FIG. 1, a top perspective view of the smokeless grill device 10 herein disclosed. As shown, a cooking grate 12 is positioned atop a surrounding grill body.

Figure 3:
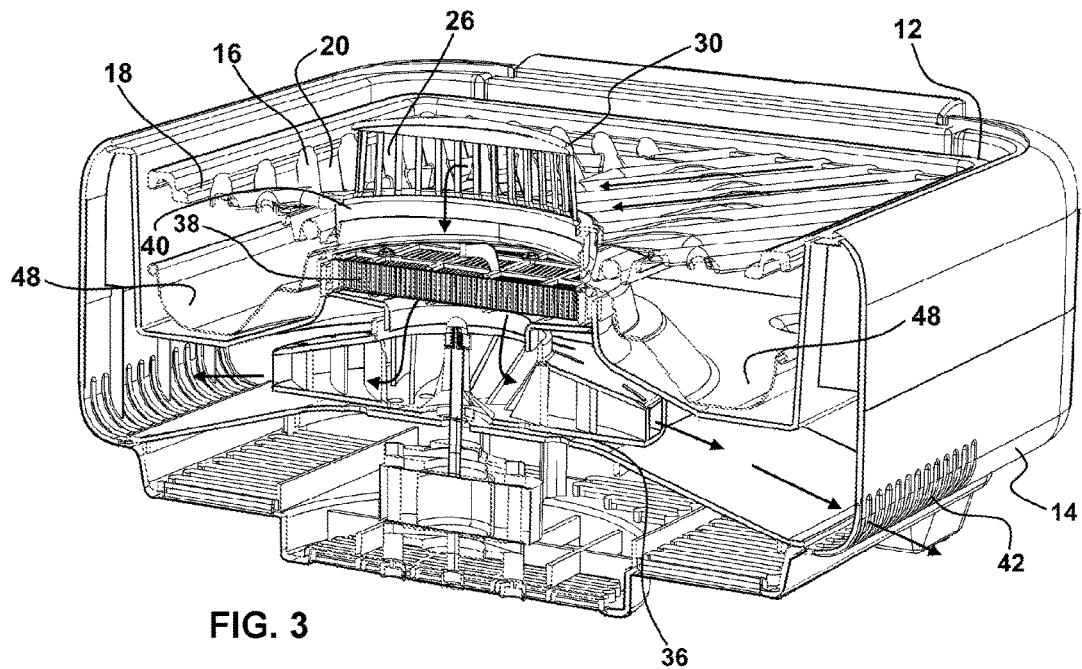
FIG. 3 is a sectional view through the grill of FIGS. 1-2 showing the electric fan drawing air communicated into the exhaust openings in the exhaust housing, through an intake opening to the filter, and to an exit from the body of the device.
Figure 4:
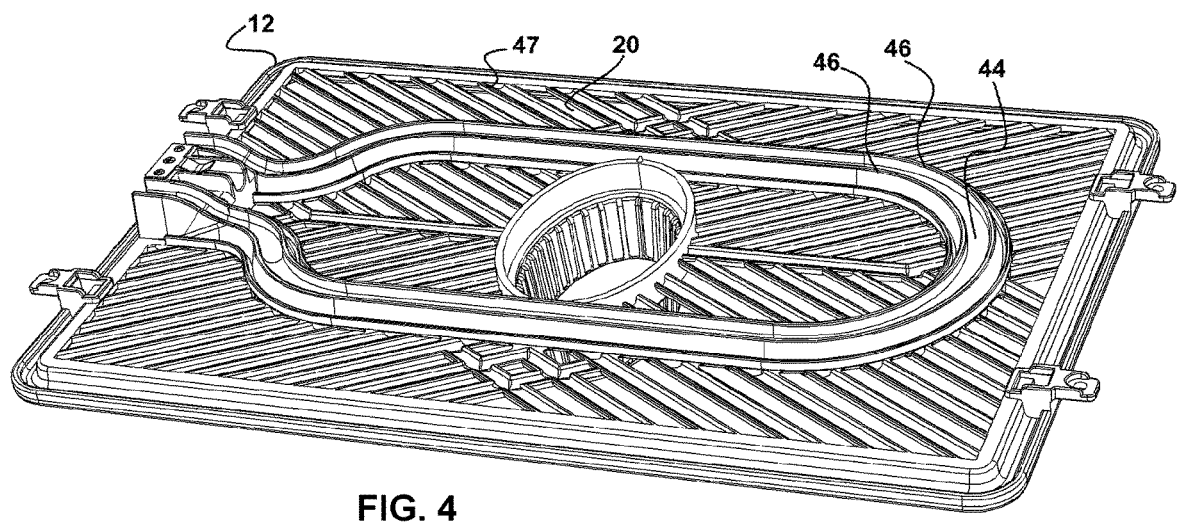
FIG. 4 shows a second side of the grate and the preferred recess formed therein surrounded by sidewalls projecting away from the second surface, where the recess protects an electric heat source from contact with liquids or oil communicated through the openings in the grate.

The grate 12 is formed preferably of a plurality of grate members 16 extending toward a central area of the grate 12 from a perimeter edge 18 thereof. Running parallel to and positioned in between the grate members 16 are a plurality of recessed gaps 20. The gaps 20 are recessed below a first surface or a support surface 22 of each grate member 16 on which food being cooked is supported. Thus, each gap 20 defines an exhaust flow passage 24 which extends in a diagonal orientation from the perimeter edge 18 of the grate 12, toward individual exhaust openings 26 communicating through a sidewall 28 of an exhaust housing 30 located in the central portion of the grate 12. Also shown in FIG. 1 is an electric supply and control 32 supplying power to heat an electrode 34 (FIG. 3).

Figure 2:
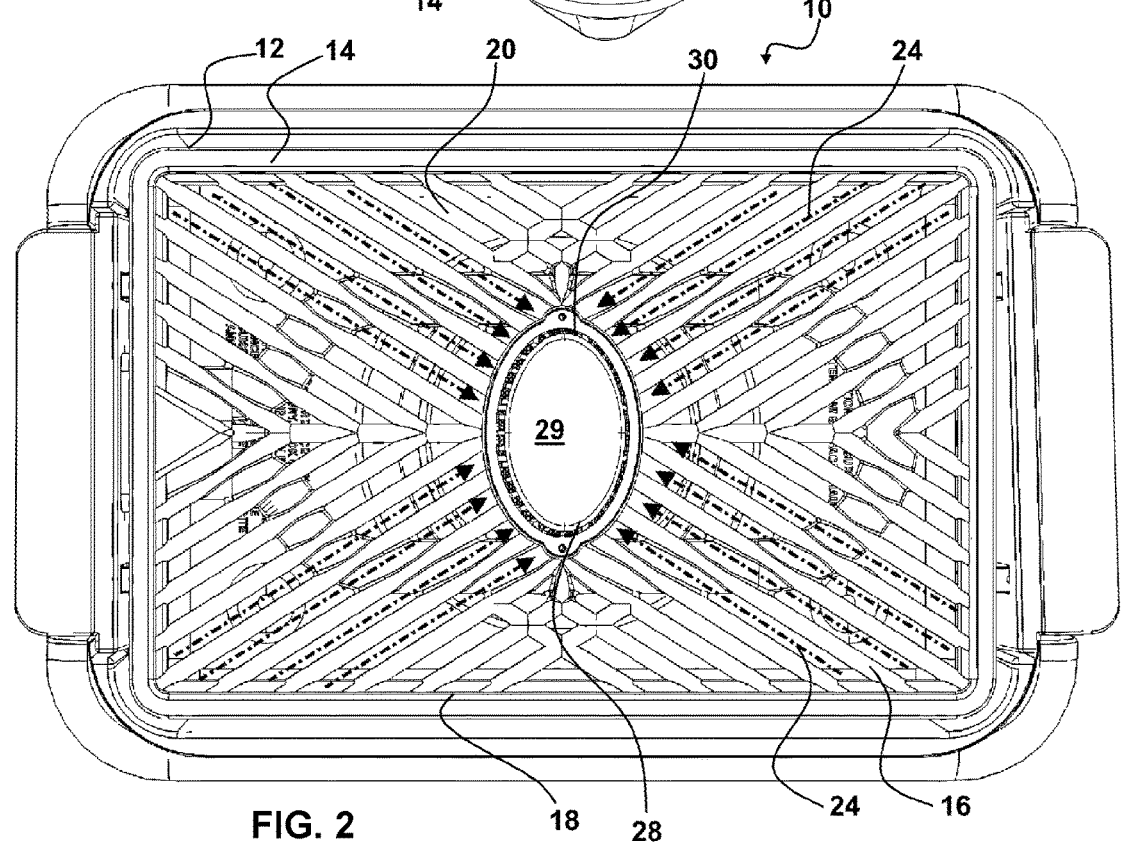
FIG. 2 depicts a top view of the smokeless cooking device of FIG. 1, showing exhaust air flow channels running diagonally in the recessed openings between the supporting members of the cooking grate, which intersect with exhaust openings formed in the projecting elliptical shaped sidewall of the exhaust housing.

Shown from overhead in FIG. 2, the exhaust housing 30 is formed in an elliptical shape having a sidewall 28 surrounding a top wall 29 and is centrally positioned on the grate 12 substantially equidistant from all four sides of the perimeter edge 18 of the grate 12.

As noted above, this ellipse shaped exhaust housing 30 when viewed from overhead as in FIG. 2, is preferred due to the enhanced communication of smoke from cooking along diagonal exhaust flow paths 24 located in the recessed gaps 20 between the members 16 forming the grate 12. The elongated curve of the sidewall 28 in this elliptical shape of the exhaust housing 30 positions the exhaust openings 26 in a better alignment with the diagonally running flow paths 24 formed in the diagonally running recessed gaps 20 between the members 16 forming the grate 12. This symbiotic relationship of sidewalls 28 of the exhaust housing 30 in this ellipse configuration better positioning the exhaust openings 26 to substantially align with the diagonal gaps 20 and the diagonal flow paths 24 is preferred as experimentation has shown enhanced smoke containment and evacuation in this configuration. By substantially align is meant that the number and positioning of the exhaust openings 26 locates them in the sidewall 28 of the exhaust housing 30 such that a portion of each such exhaust opening 26 aligns with one of the gaps 20 and air flow paths 24 therein.

The mirrored two sides of the exhaust housing 30 in respective sidewall 28 curves to form an elliptical shape of the exhaust housing 30 when viewed from overhead the grate 12 as in FIG. 2, has been found to provide the extra distance needed to position the plurality of exhaust openings 26 aligned with the plurality of diagonally running gaps 20 and airflow paths 24 defined by them. The vertically disposed side edges 27 (FIG. 6) of each of the exhaust openings 26, which run between the top wall 29 and the grate 12, can also be formed to have angled surfaces. Each opposing side edge 27 in this mode would be cut at an angle extending through the sidewall 28 which is substantially aligned with the diagonal angle of a respective gap 20 leading thereto, for additional alignment and communication of negative pressure to the gaps 20. By substantially aligned is meant plus or minus ten degrees from a line running centrally through the gap 20 with which a respective exhaust opening 26 substantially aligns.

Shown in FIG. 3 is a sectional view through the grilling device 10 of FIGS. 1-2. As shown, the electric fan 36 is positioned adjacent a filter 38 and pulls an airflow through the filter 38 from the intake opening 40 engaged with the exhaust housing 30. Thus, the fan 36 when energized by electricity forms negative pressure within the exhaust housing 30 which draws smoke in the flow paths 24 diagonally running in the gaps 20 below and between the members 16, into the exhaust housing 30 and through the filter 38.

The filter 38, as noted, is formed of material such as activated carbon or ceramic or other material, which bonds to smoke and particulate in the airstream drawn therethrough and cleans it. The fan 36 then pushes the clean smoke free air through apertures 42 in a sidewall of the grill body 14 which supports a top surface. The grill body 14, as shown, supports the grate 12 on the top surface thereof.

The electrode 34 shown in FIG. 3, heats the overhead grate 12 to cook food thereon. A shielded passage 44 for the electrode 34 is shown formed on the second or bottom surface of the grate 12 shown in FIG. 4. This shielded passage 44 is formed in a curving recess formed in between two parallel projecting walls 46. The projecting wall 46 extends from the second or bottom surface 47 of the grate 12 to respective distal ends. This is preferred so that the extremely hot surface of the energized electrode 34 is protected from contact with liquids and oil and fat which drips or communicates from the top or first surface of the grate 12, through the gaps 20, to a cooled collector plate 48 positioned under the grate 12.

Exhausting air from the fan 36 to the apertures 42 in the body 14 communicates in a cooling contact across a bottom surface of the collector plate 48 to cool it, and prevent liquids collected on the top surface from reaching a smoking temperature.

Figure 5:
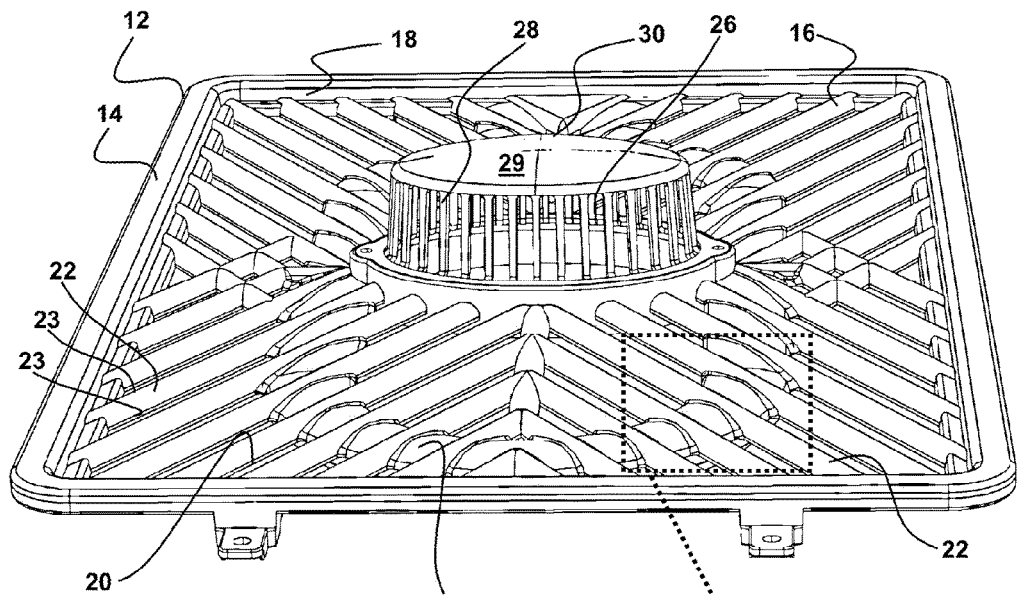
FIG. 5 depicts connectors in between the diagonally parallel members which are curved and recessed below the top surface of the members, to maintain a passage for exhausting smoke and air within the gaps from the perimeter edge to the exhaust openings in the sidewall of the exhaust housing.
Figure 6:
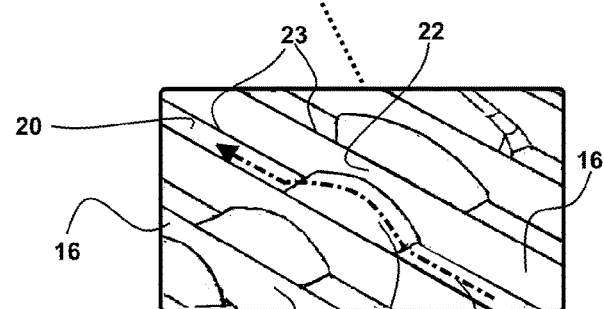
FIG. 6 shows a perspective view of the cooking grate showing the top surface of the diagonally running members forming air flow channels below and therebetween and showing the sidewall of the exhaust housing extending from and above the grate top surface a distance D to the top wall of the exhaust housing.
Figure 6:
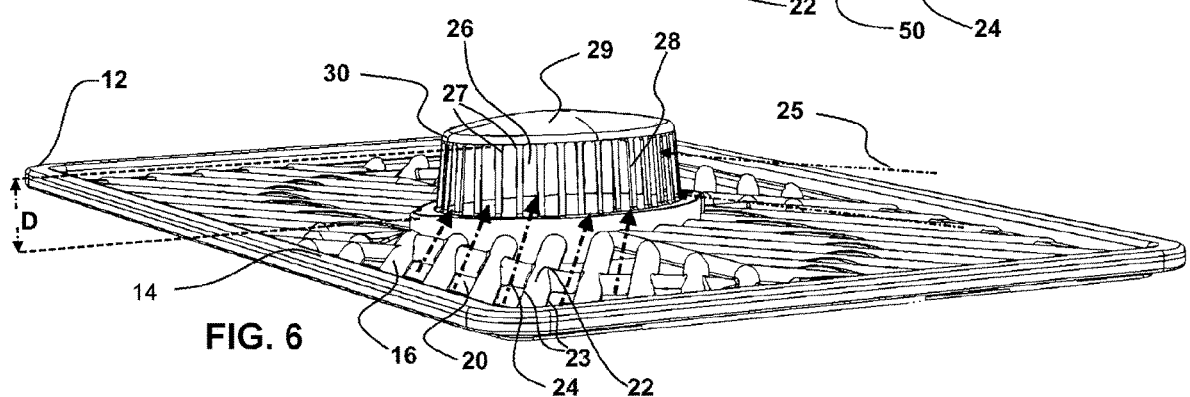

Shown in FIG. 5, is a perspective view of the top or first surface of the grate 12. As shown, the exhaust housing 30 is centrally located in the grate 12. The grate members 16 extend in a downward curve from a central support surface 22 running the length of each grate member 16 to side edges 23 on each side which define the gaps 20 therebetween and form the smoke or air flowpaths 24 (FIGS. 2 and 6). As noted, the flowpaths 24 also run diagonally from the perimeter edge 18 of the grate 12 toward the exhaust openings 26 in the sidewall of the elliptically shaped exhaust housing 30.

Also shown in FIG. 5, are connectors 50 having a curved surface thereon which is recessed below the food support surface 22 atop each of the grate members 16. By curving this top surface of the connectors 50 the airflow is accelerated there over and toward the exhaust openings 26 of the exhaust housing 30.

Shown in FIG. 6, is a perspective view of the first or top of the grate 12. This view depicts the enhanced exhaust of the flow paths 24 running within the recessed gaps 20 in between the support surface 22 of the curved grate members 16.

As shown in FIG. 5 and FIG. 6, the curved grate members 16 have a highest or peak surface at the support surface 22 area. Along the longitudinal axis of each grate member 16, they curve downward from a high point of the support surface 22, to lower elevations on both sides at side edges 23 which run along and define the gaps 20. This curved configuration forms the air flowpaths 24 recessed below the support surface 22 of the grate members 16 allows a free flow under any food positioned thereon.

Any smoke emanating from food atop the support surface 22 of the grate members 16 is drawn into the exhaust openings 26 because the exhaust housing 30 extends a distance "D" of the sidewall 28 thereof, above the support surface 22 of the grate members 16. The elongated exhaust openings 26 thus create negative air pressure communicated from the fan along their lengths and pull an elevated airstream 25 above any food on the grate 12, and into the exhaust housing 30. Currently, the distance D of the elevation of the sidewall 28 is substantially between ½ to 3 inches.

It should be noted that any of the different depicted and described configurations and components of the smokeless grill herein, can be employed with any other configuration or component shown and described as part of the device herein. Additionally, while the present invention has been described herein with reference to particular embodiments thereof and/or steps in the method of production or use, a latitude of modifications, various changes and substitutions are intended in the foregoing disclosure, and it will be appreciated that in some instance some features, or configurations, of the invention could be employed without a corresponding use of other features without departing from the scope of the invention as set forth in the following claims. All such changes, alternations and modifications as would occur to those skilled in the art are considered to be within the scope of this invention as broadly defined in the appended claims.

Further, the purpose of any abstract included with this specification is to enable the U.S. Patent and Trademark Office, the public generally, and especially the scientists, engineers, and practitioners in the art who are not familiar with patent or legal terms or phraseology, to determine quickly from a cursory inspection the nature and essence of the technical disclosure of the application. Any such abstract is neither intended to define the invention of the application, which is measured by the claims, nor is it intended to be limiting, as to the scope of the invention in any way.

What is claimed is:

1. A grill apparatus, comprising:
   a grill body having a sidewall, said grill body coupled to a grate on a top surface thereof;
   said grate formed of a plurality of grate members extending diagonally in between a grate perimeter edge toward a central portion of said grate;
   a plurality of gaps communicating through said grate in between said grate members, said gaps running diagonally in between said grate members;
   support surfaces centrally located on each of said grate members, said support surfaces defining a top surface, said support surfaces running between said grate perimeter and said central portion of said grate and configured to support cooking food thereon;
   an exhaust housing positioned in said central portion of said grate, said exhaust housing having a sidewall extending a distance above said support surfaces to a top wall of said exhaust housing;
   a plurality of exhaust openings communicating through said sidewall of said exhaust housing with an interior cavity therein;
   said interior cavity in communication with an intake opening of an exhaust conduit;
   a filter positioned within said exhaust conduit;
   said exhaust conduit communicating to exhaust apertures in said body;
   an electric fan positioned within said exhaust conduit, said fan having an energized state when operatively engaged to electric power;
   said fan generating negative air pressure within said exhaust conduit and said interior cavity of said exhaust housing;
   said plurality of gaps defining a plurality of diagonal airflow paths in between said grate members; and
   wherein, air having smoke generated by cooking of said food on said grate, is pulled through said exhaust openings from said airflow paths and through said filter in said exhaust conduit by said negative air pressure, said air exiting said exhaust conduit through said exhaust openings in an exiting airstream.

2. The grill apparatus of claim 1, additionally comprising:
   said sidewall of said exhaust housing having a curve forming said exhaust housing to an elliptical shape when viewed from above said grate; and
   said exhaust openings positioned along said sidewall to substantially align with said diagonal airflow paths.

3. The grill apparatus of claim 2, additionally comprising:
   said grate members curving downward from a high point at said support surface to lower elevations at side edges of said grate members adjacent said gaps.

4. The grill apparatus of claim 3, additionally comprising:
   opposing side edges of said exhaust openings communicating through said sidewall and extending in between said topwall of said exhaust housing and said grate, being formed at an angle substantially aligned with a respective gap aligning with said exhaust opening.

5. The grill apparatus of claim 3, additionally comprising:
   a collector plate positioned within said body of said grill and configured to collect liquids dripping through said gaps in said grate; and said exiting airstream running in an airstream contact across a surface of said collector plate, said airstream contact imparting a cooling to said collector plate and any said liquids thereon.

6. The grill apparatus of claim 5, additionally comprising:
said grate having a bottom surface opposite said top surface; and
a shielded passage formed into said bottom surface in a curving recess in between two parallel projecting walls; and
said shielded passage configured for positioning of an electrode therein in a position shielded from liquids communicating through said gaps.

7. The grill apparatus of claim 3, additionally comprising:
said grate having a bottom surface opposite said top surface; and
a shielded passage formed into said bottom surface in a curving recess in between two parallel projecting walls; and
said shielded passage configured for positioning of an electrode therein in a position shielded from liquids communicating through said gaps.

8. The grill apparatus of claim 2, additionally comprising:
opposing side edges of said exhaust openings communicating through said sidewall and extending in between said topwall of said exhaust housing and said grate, being formed at an angle substantially aligned with a respective gap aligning with said exhaust opening.

9. The grill apparatus of claim 2, additionally comprising:
a collector plate positioned within said body of said grill and configured to collect liquids dripping through said gaps in said grate; and
said exiting airstream running in an airstream contact across a surface of said collector plate, said airstream contact imparting a cooling to said collector plate and any said liquids thereon.

10. The grill apparatus of claim 9, additionally comprising:
said grate having a bottom surface opposite said top surface; and
a shielded passage formed into said bottom surface in a curving recess in between two parallel projecting walls; and
said shielded passage configured for positioning of an electrode therein in a position shielded from liquids communicating through said gaps.

11. The grill apparatus of claim 2, additionally comprising:
said grate having a bottom surface opposite said top surface; and
a shielded passage formed into said bottom surface in a curving recess in between two parallel projecting walls; and
said shielded passage configured for positioning of an electrode therein in a position shielded from liquids communicating through said gaps.

12. The grill apparatus of claim 1, additionally comprising:
said grate members curving downward from a high point at said support surface to lower elevations at side edges of said grate members adjacent said gaps.

13. The grill apparatus of claim 12, additionally comprising:
a collector plate positioned within said body of said grill and configured to collect liquids dripping through said gaps in said grate; and
said exiting airstream running in an airstream contact across a surface of said collector plate, said airstream contact imparting a cooling to said collector plate and any said liquids thereon.

14. The grill apparatus of claim 13, additionally comprising:
said grate having a bottom surface opposite said top surface; and
a shielded passage formed into said bottom surface in a curving recess in between two parallel projecting walls; and
said shielded passage configured for positioning of an electrode therein in a position shielded from liquids communicating through said gaps.

15. The grill apparatus of claim 12, additionally comprising:
said grate having a bottom surface opposite said top surface; and
a shielded passage formed into said bottom surface in a curving recess in-between two parallel projecting walls; and
said shielded passage configured for positioning of an electrode therein in a position shielded from liquids communicating through said gaps.

16. The grill apparatus of claim 1, additionally comprising:
a collector plate positioned within said body of said grill and configured to collect liquids dripping through said gaps in said grate; and
said exiting airstream running in an airstream contact across a surface of said collector plate, said airstream contact imparting a cooling to said collector plate and any said liquids thereon.

17. The grill apparatus of claim 16, additionally comprising:
said grate having a bottom surface opposite said top surface; and
a shielded passage formed into said bottom surface in a curving recess in between two parallel projecting walls; and
said shielded passage configured for positioning of an electrode therein in a position shielded from liquids communicating through said gaps.

18. The grill apparatus of claim 1, additionally comprising:
said grate having a bottom surface opposite said top surface; and
a shielded passage formed into said bottom surface in a curving recess in between two parallel projecting walls; and
said shielded passage configured for positioning of an electrode therein in a position shielded from liquids communicating through said gaps.

* * * * *